US011314865B2

(12) United States Patent
August et al.

(10) Patent No.: US 11,314,865 B2
(45) Date of Patent: *Apr. 26, 2022

(54) PLUGGABLE TRUST ARCHITECTURE

(71) Applicant: THE TRUSTEES OF PRINCETON UNIVERSITY, Princeton, NJ (US)

(72) Inventors: David I. August, Princeton, NJ (US); Stephen Beard, New York, NY (US); Soumyadeep Ghosh, Sunnyvale, CA (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 201 days.

This patent is subject to a terminal disclaimer.

(21) Appl. No.: 16/050,589

(22) Filed: Jul. 31, 2018

(65) Prior Publication Data
US 2019/0042750 A1 Feb. 7, 2019

Related U.S. Application Data

(60) Provisional application No. 62/539,586, filed on Aug. 1, 2017.

(51) Int. Cl.
*G06F 21/00* (2013.01)
*G06F 21/57* (2013.01)
(Continued)

(52) U.S. Cl.
CPC .......... *G06F 21/57* (2013.01); *G06F 9/30116* (2013.01); *G06F 9/30145* (2013.01); *G06F 9/3814* (2013.01); *G06F 9/3838* (2013.01); *G06F 9/44589* (2013.01); *G06F 11/36* (2013.01); *G06F 11/3636* (2013.01);
(Continued)

(58) Field of Classification Search
CPC .......... G06F 21/50; G06F 21/51; G06F 21/52; G06F 21/53; G06F 21/54; G06F 21/57; G06F 21/577; G06F 21/70; G06F 21/71
See application file for complete search history.

(56) References Cited

U.S. PATENT DOCUMENTS

| 5,734,868 A | 3/1998 | Curd et al. |
| 7,389,429 B1 | 6/2008 | Trimberger |

(Continued)

FOREIGN PATENT DOCUMENTS

WO  WO-2016065014 A1 * 4/2016 ........... G06F 21/577

OTHER PUBLICATIONS

T. M. Austin. "DIVA: A Reliable Substrate for Deep Submicron Microarchitecture Design " In Proceedings of the 32nd Annual ACM/IEEE International Symposium on Microarchitecture, pp. 196-207. IEEE Computer Society, 1999.
T. M. Austin. "DIVA: A Dynamic Approach to Microprocessor Verification " Journal of Instruction-Level Parallelism, 2: 1-6, 2000.
Y. Fei and Z. J. Shi. "Microarchitectural Support for Program Code Integrity Monitoring in Application-specific Instruction Set Processors." In Proceedings of the Conference on Design, Automation and Test in Europe, Date '07, pp. 815-820, San Jose. CA, USA, 2007. EDA Consortium.

(Continued)

*Primary Examiner* — Edward Zee
(74) *Attorney, Agent, or Firm* — Valauskas Corder LLC

(57) ABSTRACT

A pluggable trust architecture addresses the problem of establishing trust in hardware. The architecture has low impact on system performance and comprises a simple, user-supplied, and pluggable hardware element. The hardware element physically separates the untrusted components of a system from peripheral components that communicate with the external world. The invention only allows results of correct execution of software to be communicated externally.

28 Claims, 10 Drawing Sheets

(51) Int. Cl.

| | | |
|---|---|---|
| *G06F 21/75* | (2013.01) | |
| *G06F 21/85* | (2013.01) | |
| *G06F 9/445* | (2018.01) | |
| *H04L 9/32* | (2006.01) | |
| *G06F 9/30* | (2018.01) | |
| *G06F 9/38* | (2018.01) | |
| *G06F 11/36* | (2006.01) | |
| *G06F 9/4401* | (2018.01) | |

(52) U.S. Cl.
CPC .............. *G06F 21/75* (2013.01); *G06F 21/85* (2013.01); *H04L 9/3242* (2013.01); *G06F 9/4411* (2013.01)

(56) References Cited

U.S. PATENT DOCUMENTS

| | | | |
|---|---|---|---|
| 7,464,383 | B1 | 12/2008 | Dow |
| 2006/0236111 | A1 | 10/2006 | Bodensjo et al. |
| 2011/0154059 | A1 | 6/2011 | Durham et al. |
| 2012/0167209 | A1 | 6/2012 | Molnar et al. |
| 2012/0210071 | A1* | 8/2012 | Black ................. G06F 12/1036 711/130 |
| 2015/0154407 | A1* | 6/2015 | Yi ............................. G06F 8/44 713/194 |

OTHER PUBLICATIONS

B. Gassend, G. E. Suh, D. Clarke, M. van Dijk, and S. Devadas. "Caches and Hash Trees for Efficient Memory Integrity Verification". In Proceedings of the 9th International Symposium on High-Pelfonnance Computer Architecture, HPCA 03, pp. 295-, Washington, DC, USA, 2003. IEEE Computer Society.

D. Lie, C. A. Thekkath, M. Mitchell, P. Lincoln, D. 8oneh, J. C. Mitchell, and M. Horowitz. "Architectural Support for Copy and Tamper Resistant Software". In Architectural Support for Programming Languages and Operating Systems, pp. 168-177, 2000.

G. E. Suh, D. Clarke, 8. Gassend, M. v. Dijk, and S. Devadas. "Efficient Memory Integrity Verification and Encryption for Secure Processors". In Proceedings of the 36th Annual IEEE/ACM International Symposium on Microarchitecture, MICRO 36, pp. 339-, Washington, DC, USA, 2003. IEEE Computer Society.

E. Biham, Y. Carmeli, and A. Shamir, "Bug attacks," in Advances in Cryptology—CRYPTO 2008 (D. Wagner, ed.), vol. 5157 of Lecture Notes in Computer Science, pp. 221-240, Springer Berlin Heidelberg, 2008.

International Search Report, PCT/US15/56678, United States Patent and Trademark Office, dated Jan. 15, 2016.

* cited by examiner

PLUGGABLE TRUST ARCHITECTURE

CROSS-REFERENCE TO RELATED PATENTS

This application claims the benefit of U.S. Provisional Application No. 62/539,586 filed Aug. 1, 2017.

STATEMENT REGARDING FEDERALLY SPONSORED RESEARCH OR DEVELOPMENT

This invention was made with government support under Grant No. FA8750-10-2-0253 awarded by the United States Air Force (AFRL/RI) and Grant No. CNS-1441650 awarded by the National Science Foundation. The government has certain rights in the invention.

FIELD OF THE INVENTION

The invention relates to a pluggable architecture for untrusted components. Specifically, the invention enables users to trust their computer systems independent of the trustworthiness of other system components.

BACKGROUND OF THE INVENTION

Computers are complex and opaque such that a user cannot know everything occurring within the system. While users may believe their systems are secure as long as they run only trusted software, trusted software is only as trustworthy as the underlying hardware.

Vulnerabilities of the system may be exploited by attackers (i.e., hackers). For example, attackers can insert hardware backdoors or exploit hardware errors that bypass normal authentication or security controls to gain unauthorized access to sensitive data. Other examples of hardware attacks may include eavesdropping by gaining access to protected memory without opening other hardware, inducing faults that interrupt normal behavior, or modifying or removing hardware restrictions through the use of software exploits. One such attack is known as the Trojan circuit, an insidious attack that involves planting a vulnerability in a processor sometime between design and fabrication that manifests after the processor has been integrated, tested, and deployed as part of a system.

A modern computing system is generally some combination of processors, volatile and non-volatile memory of various types, interconnects, and I/O devices. Many of these components have firmware, microcode, or other means of field configuration that may provide means for an attack. Malicious software may operate outside the trusted software domain, taking the form of a hypervisor or virtual machine, which may modify or steal data used by trusted software.

Due to the complexity of building hardware and software, architects and manufacturers have limited confidence in their verification processes to ensure their systems have not been altered maliciously. Building a modern computer system often involves different parties from the initial specification all the way to fabrication such that system integrity is difficult to ensure during the design and fabrication process. For example, an adversary could modify the design or fabrication of hardware components. Furthermore, for economic reasons, many steps after the initial system specification are outsourced off-shore, where design and fabrication are less expensive. In addition, many of the components used may also include intellectual property restrictions that disallow other parties from viewing detailed information about the component. Even with an open design, verifying modern complex hardware designs can be an intractable problem. Compromises in the supply chain may affect hardware integrity even though every step of the manufacturing process is secure.

In addition, validation of designs remains incomplete. As an example, Trojan circuits are typically activated under very specific conditions making them unlikely to be activated and detected using random or functional stimuli.

Other attacks could be mounted based on inadvertent errors during design or fabrication. For example, a devastating attack has been recently demonstrated using an extremely subtle multiplication bug that computes the wrong product for a single pair of 64-bit integers. If such a pair of numbers is known, it becomes possible to compromise software running on any device whose processor or microprocessor has the multiplication bug using a single chosen message. It is infeasible to test multipliers for all pairs of 64-bit integers.

Even if hardware vulnerabilities are not introduced during the hardware supply chain, software introduced after deployment may introduce vulnerabilities by, for example, intercepting processor instructions to perform actions as if the hardware had been compromised. Such vulnerabilities may be invited by the user, either intentionally or accidentally, and delivered via the network.

Vulnerabilities include, for example, backdoors inserted in the untrusted processor during design or fabrication that access a peripheral component without authorization, malicious changes or inadvertent bugs in the processor that lead to incorrect execution of instructions, weakening encryption or changing information sent to peripherals, untrusted components such as memory and/or on-chip networks that manipulate data, weakening encryption or changing information sent to peripherals, and unverified software that execute on the system and communicate sensitive data to the peripherals. The term "peripheral component" or "peripheral" is any ancillary element used to put information into and get information out of the computer and includes any hardware component or software component.

Considering these challenges, it is unreasonable to assume that all components, including both hardware and software, in a system can be verified and not bypassed. However, users may wish to trust that their private information is not exposed to external adversaries even in the presence of malicious hardware and software. Currently, the user's trust is based on representations made by each party supplying the system's hardware and software components. Therefore, there is a demand for establishing trust in hardware and software improving the privacy and integrity of computers, thus making them more secure.

SUMMARY OF THE INVENTION

The invention is directed to a new class of architectures wherein trust is established via a relatively simple independently-sourced pluggable hardware element. According to the invention, pluggable trust architectures rely on the observation that a relatively simple component with an open design can be verified and can form the basis of trust in a system. Ideally, the hardware element can enable the detection and isolation of malicious behavior by untrusted system components before the manifestation of any externally visible effects from such behavior.

For purposes of this application, it should be noted that the hardware element does not require software in all its instantiations. For example, a processor could send information to be checked to the hardware element such as that described in International Patent Application PCT/US2015/056678 filed Oct. 21, 2015, or other hardware components could send information to be checked to the hardware element as further described below. Alternatively, software running on a host component can communicate information to be checked by the hardware element. A host component may be a computer or other device connected to the system that includes software and provides information such as resources, services, and applications to users of the system.

The term "hardware" is used interchangeably with the term "hardware components", which refer to any interconnected electronic components that perform operations. For example, hardware components include individual chips or circuits, processing units such as graphics processing units (GPUs), or processors including an arithmetic logic unit and registers, a control unit including a register and counter, memory, any peripheral component such as disks and expansion cards, and may even include distributed information processing systems, to name a few. It is also contemplated that hardware components may be directed to any reconfigurable fabric that combines any software with any hardware for processing such as a field-programmable gate array (FPGA).

The term "software" is used interchangeably with the term "software components", which refer to any instructions to perform operations by interconnected electronic components. For example, software components include programs, instructions or operating information, libraries, digital media, data, and any peripheral component to name a few.

According to the invention, a computer system includes a pluggable trust architecture that comprises a separately manufactured, pluggable hardware element. The separate sourcing of the hardware element and its pluggability in the architecture enable users to trust their system independent of the trustworthiness of other system components.

According to one embodiment, the hardware element may be a verification element. As an example, the hardware element may be a verification element known and referred to as the "Sentry" element. Accordingly, the verification element may include a hardware component or a hardware component including software component. For purposes of the invention, a software component may be integral with the hardware component or a peripheral component, such as a host component, that supplies the software component to the hardware element.

The hardware element physically separates (untrusted) hardware components from the external world and is itself the only trusted component in the system. The hardware element prevents untrusted hardware and software from causing harmful externally visible side-effects.

More specifically, the hardware element resides physically between the (untrusted) system and any component that communicates externally. The hardware element verifies all attempts to send out information through such components. The pluggable architecture quarantines the effects of malicious behavior by allowing only the correctly executed results of approved software to be communicated externally. Approved software may be any software that complies with standards or requirements as determined by the user or system administrator or approved by a toolchain, which determines the software to be trusted.

While untrusted components in the system could gain access to and manipulate user data, the hardware element combined with a programmed software component guarantees that output resulting from only verified and correct operations and data can be communicated outside the system. The architecture according to the invention places the hardware element on what is known as the input/output (I/O) path, thus allowing it to be separately manufactured, independently verified, and installed in systems post-deployment.

The verification functionality of the hardware element is partly inspired by redundant execution-based techniques used to detect transient faults, such as DIVA, which trust some aspects of the processor trace information. The motivation of the present invention is to not rely on any aspect of the processor trace. The hardware element of the pluggable architecture may be separately manufactured with a much simpler manufacturing and supply chain giving it immunity from malicious changes introduced during the processor's fabrication process.

One advantage of the invention is that execution information sent to the hardware element for checking decouples program execution from verification by the hardware element. This allows the system to run nearly unhindered and experience minimal performance decline. Consequently, the hardware element could even operate at lower clock frequency than an untrusted processor so that it can be manufactured separately using older technology in trusted domestic fabrication plants. It is contemplated that in circumstances in which verification by the hardware element fails, the program reverts back to a prior good state and an alert is provided to the user communicating the detection of an error. At the same time, no further output is sent over the external interfaces.

The architecture of the invention protects against information leakage resulting from attacks of untrusted components. For example, attacks of untrusted components may include: (1) incorrect arithmetic instruction execution (e.g. multiplier bug compromising a cryptosystem), (2) jumping to an incorrectly calculated branch target, (3) changing a loop exit condition to execute one more iteration, (4) modification of values in the register file, (5) modification of values in memory, (6) relocation of data in memory, (7) insertion of non-program instructions, (8) skipping the execution of program instructions, (9) reordering instructions in the processor's instruction stream incorrectly, (10) execution of unapproved software, (11) malicious software implementation of hardware functionality. Attacks related to explicit information leakage may include, for example, a hardware Trojan in the untrusted processor writing out to a peripheral, one or more instructions executing incorrectly, weakening encryption or changing information sent to peripherals, or untrusted components such as memory and/or on-chip networks manipulating data, weakening encryption, or changing information sent to peripherals. Preventing information leakage resulting from these types of attacks provide the end-user with assurances about the trustworthiness of the system.

According to one embodiment, the invention employs a hardware element that acts as a gatekeeper to the outside world, only allowing external communication resulting from the user's desired actions. The hardware element is pluggable, swappable, upgradeable, and removable. The hardware element prevents inadvertent or intentional hardware modifications from becoming dangerous. Therefore, end users concerned about privacy and integrity of their computer hardware may implement the invention to prevent harmful side effects occurring due to malicious behavior by hardware. The invention may also be implemented to detect errors and harmful effects caused by hardware design or fabrication. Similarly, the invention may be used to test supply chain quality. For example, hardware designers can use the invention to test that third-party manufacturers have faithfully manufactured chips based on their design.

According to the invention, an architecture comprises a system and a trusted hardware element. At least one element in the system, in software, hardware, or both, is configured to send trace information regarding execution to the trusted hardware element. The hardware element is configured to receive execution information from the system to detect at least one form of incorrect execution by the system without relying on any execution information to be correct. As an example, the hardware element may detect incorrect execution of instructions affecting output via peripheral components or devices. Peripheral components or devices include anything external to the system, e.g., computer system, portable device, processor, etc.

System software configured to send trace information regarding execution to the trusted hardware element can be modified at any contemplated position within the system, for example, within a compilation toolchain, a hypervisor, a virtual machine, an emulator. It is further contemplated that other information besides trace information may be sent to the trusted hardware element, for example, proof information in order to reduce the amount of dynamic trace information that the hardware element may need to verify execution.

The hardware element further includes a barrier circuit for preventing any computer system output to a device resulting from incorrect execution including the prevention of output via peripheral components. In preferred embodiments, it is contemplated that any portion of the hardware element or barrier circuit are removable from the system, preventing output when any portion of the hardware element or barrier circuit is removed from the architecture.

The hardware element may further comprise a buffer for storing untrusted trace information sent by the system. The buffer may be referred to as an incoming trace buffer, an execution buffer or a write buffer. According to one embodiment, the execution buffer contains the results of instructions causing output to devices that are waiting to be verified. Additionally, the hardware element may further comprise a buffer for enabling memory integrity checks. The buffer may be referred to as an outgoing buffer, a hash buffer or (shadow) message authentication code (S)MAC) buffer. According to one embodiment, the outgoing buffer stores message authentication code (MAC) values independently generated by the hardware element for every memory instruction.

The hardware element may further include a checking unit that performs verification. The checking unit includes a pipelined process that enables parallel checking. According to the invention, the checking unit may include any number of parallel pipeline registers. More specifically, the checking unit may include a verification engine for checking correctness of instructions. In embodiments where the instructions are memory instructions, the checking unit may further include a MAC (Message Authentication Code) generator for checking integrity of the memory and a program code. As an example, the MAC generator may be a hash generator, although any memory integrity assurance scheme is contemplated, whether cryptographic or not. The checking unit may also include a shadow register file to verify one or more operands used by the processor. The shadow register file may contain all the register values corresponding to verified instructions along with the results reported by instructions currently in the later stages of the hardware element's pipeline.

Correctness of execution is evaluated in order to determine if system output should be sent to external or peripheral devices. A processor executes instructions producing untrusted trace information that is sent to the hardware element.

A buffer in the hardware element may be used to store the untrusted trace information. The hardware element examines at least the aspects of the untrusted trace information intended to generate computer system output to a peripheral device. For example, the hardware element may examine the aspects of the trace information to check for correctness of execution of all instructions, correctness of execution of instructions influencing communication external to the computer system, integrity of memory instructions, integrity of code being executed, and correctness of signatures of installed software, to name a few. Aspects of untrusted trace information may include, for example, one or more instructions, operands, results, and MAC values such as hash values.

The hardware element examines certain aspects of the untrusted trace information by independently checking (for example, but not limited to, by re-execution) the one or more instructions that lead to computer system output. The results of checking are compared by the hardware element to the corresponding aspects of the untrusted trace information. According to a particular embodiment, the hardware element writes the results from the untrusted trace information to one or more pipeline registers and a shadow register file. The hardware element ensures that if two or more instructions in the same stage try to write into the same shadow register file, only the value corresponding to the instruction appearing later in program order is written. The hardware element may further simultaneously verify execution of two or more instructions in parallel as well as break dependencies between two or more instructions using the untrusted trace information.

After the results are written to pipeline registers, instructions are fetched and decoded, such as from an incoming trace buffer, and one or more operands are sent by the hardware element to the pipeline registers. The instructions are checked to ensure they originate from an approved, correctly signed program. The instructions are executed using the operands in the pipeline registers. Results are then compared against results of the untrusted trace information. If the results are equal, output to external peripheral components is allowed. The hardware element may further include a cache that may be populated with one or more instructions to be verified or that have been verified by the hardware element. As an example, the cache may be a single-level instruction cache controlled by the processor to alleviate the latency of memory accesses.

According to certain embodiments of the invention, the instructions in the untrusted trace information may be memory instructions. Memory instructions may include a store operation to write values into the memory and a load operation to load values from the memory. For some embodiments, the hardware element may use cryptographic verification using one or more message authentication codes (MAC) for data loaded from or stored to the memory.

For store instructions, cryptographic verification may include generating by the hardware element a message authentication code (MAC) value corresponding to each store. Each MAC value is based on a stored value, a memory store address, and a secret key. Each MAC value is stored in a buffer of the hardware element. The hardware element sends to the processor MAC values, which are stored by the processor in a shadow memory.

For load instructions, the cryptographic verification may include sending by the processor to the hardware element a value loaded from the memory and a corresponding loaded message authentication code (MAC) value as part of the untrusted trace information. The hardware element generates a MAC value corresponding to each load. Each MAC value is based on a loaded value, a memory load address, and a secret key. The hardware element determines if the loaded MAC value and the generated MAC value are equal. This may be done by comparing the generated MAC value with a MAC value in the buffer if the buffer contains an entry for the memory load address or by comparing the generated MAC with the loaded MAC value sent as part of the untrusted trace information.

System output is produced by the hardware element and sent external to the system only when the aspects examined are correct. A barrier circuit of the hardware element produces computer system output to a device only when the aspects examined are correct.

According to another embodiment of the invention, the software installed in the system may be verified during installation. The verification may be performed by allowing only signed software to be installed on the system.

The invention and its attributes and advantages may be further understood and appreciated with reference to the detailed description below of one contemplated embodiment, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which.

DETAILED DESCRIPTION OF EMBODIMENTS OF THE INVENTION

According to the invention, all hardware components including, for example, a CPU, a memory, and peripheral components cannot be trusted. Untrustworthiness could be a result of unreliability, security flaws in design, or malicious logic such as that inserted by third-party intellectual property providers or during chip fabrication.

Figure 1:
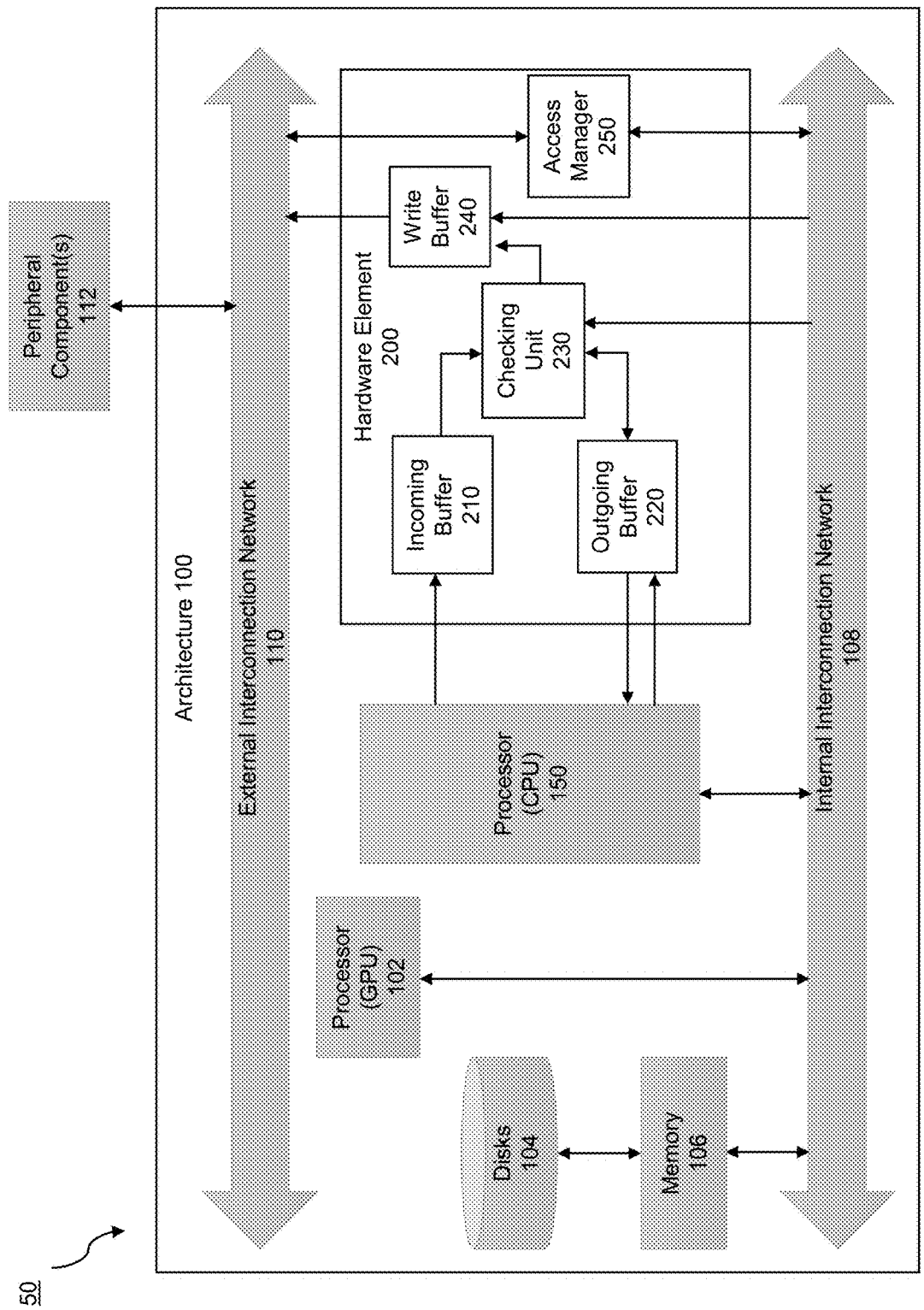
FIG. 1 illustrates a block diagram of a system including a pluggable architecture according to an embodiment of the invention.

FIG. 1 illustrates a block diagram of a system 50 including pluggable architecture 100 according to an embodiment of the invention. The architecture 100 includes a simple, pluggable, trusted hardware element 200 and a variety of untrusted hardware components—shown as shaded components in FIG. 1—including a graphics processing unit (GPU) 102, disks 104, memory 106, processor (CPU) 150, interconnection networks 108, 110, and peripheral components 112.

Specifically, the architecture 100 includes a hardware element 200 and an untrusted fast, conventional processor 150. As shown in FIG. 1, the hardware element 200 is the only trusted component in the architecture 100 and acts as the gatekeeper on the only path in and out of the system 50 via external interconnection network 110. Approval by the hardware element 200 is required before (1) the processor 150 or the memory 106 sends data to peripheral components 112 or (2) any peripheral component 112 accesses the memory 106 or the processor 150.

To gain access to peripheral components 112 that communicate externally, the system 50 provides enough information for the hardware element 200 to verify that anything to be communicated to peripheral components 112 resulted from correct execution by the processor 150. The hardware element 200 verifies that processor 150 execution leading to external communication is correct. This includes ensuring that memory 106 integrity is maintained even though the memory 106 itself is untrusted. Only when the execution leading to external communication is found correct does the hardware element 200 allow such communication to actually take place.

This design has at least two benefits. First, it puts the onus of proving the correctness of execution on the (untrusted) system 50. If the system 50 wants to communicate externally, it must send correct execution information to the hardware element 200. Otherwise, the processor 150 could still continue with execution, but would not be allowed to access peripherals 112. Second, it decouples execution by the processor 150 from verification by the hardware element 200. This minimizes the performance impact of the hardware element 200 on the system 50.

The hardware element 200 includes an incoming buffer 210, outgoing buffer 220 and a checking unit 230. The hardware element 200 buffers the results or output of the processor's 150 committed instructions in the incoming buffer 210, also referred to as an incoming trace buffer. The hardware element 200 fetches the instructions to be verified from memory 106 via internal interconnection network 108. The fetch logic determines the memory address to be fetched either from the results reported by the processor 150 using the incoming trace buffer 210 or from the addresses of previous instructions such as those maintained using a Program Counter (PC) register.

Figure 2:
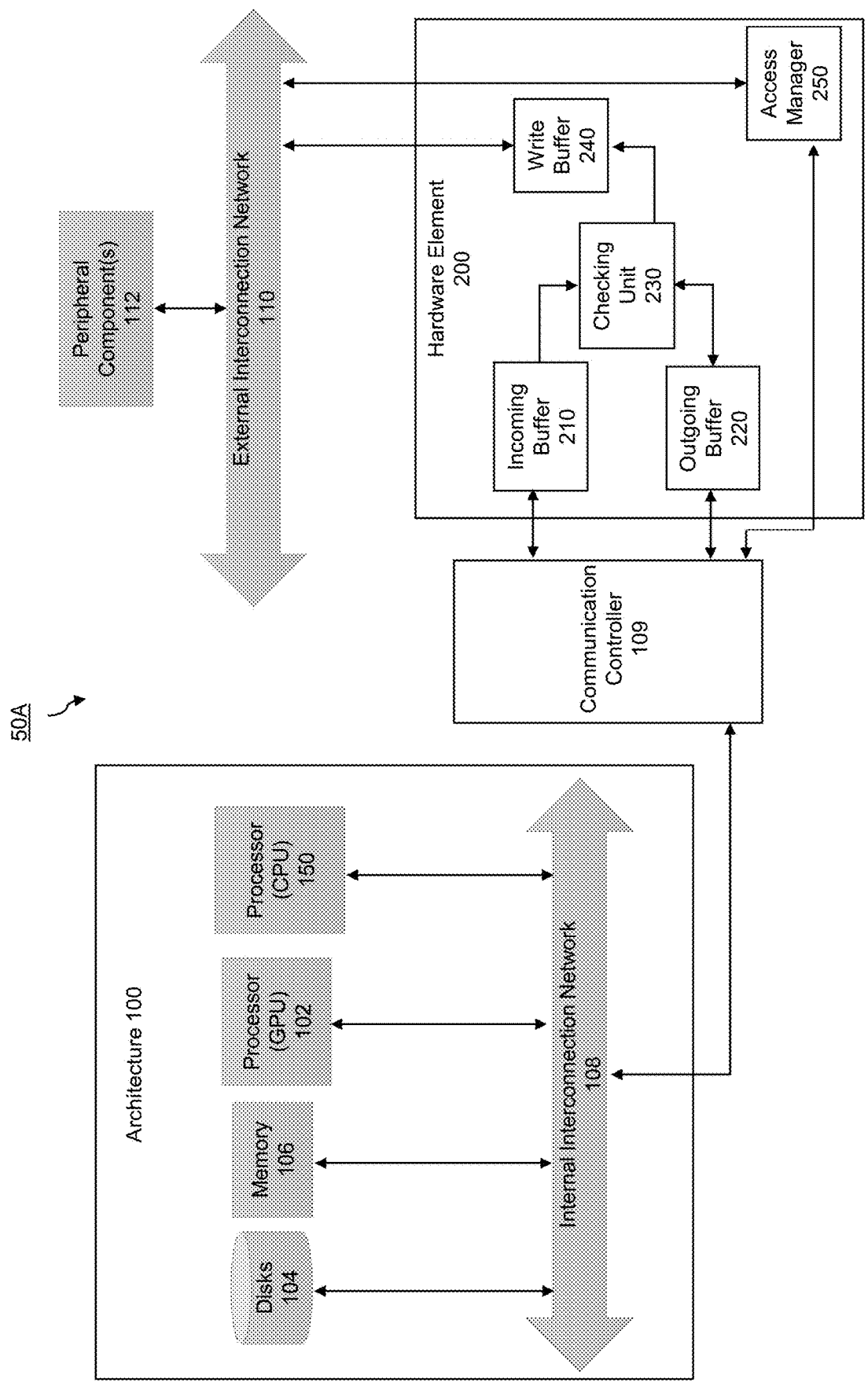
FIG. 2 illustrates a block diagram of a system including a separate hardware element according to another embodiment of the invention.

The checking unit 230 independently executes the instructions and writes the result or output to the outgoing buffer 220. The checking unit 230 includes a pipelined process that enables parallel checking. According to the invention, the checking unit 230 may include any number of parallel pipeline registers, for example, 4 parallel pipeline registers (4-wide) as shown in FIG. 2. It is noted that the greater the number of parallel pipelines, the less likely the processor 150 experiences stalls. Stalls may be caused, for example, due to the inability of the hardware element 200 to keep up with the processor 150 resulting in a full incoming buffer 210. Stalls may also result from bandwidth limitations between the processor 150 and the hardware element 200.

Instructions are considered verified when output from instructions executed by the checking unit 230 match the output of the outgoing buffer 220 of the processor's 150 committed instructions.

In certain embodiments of the invention, the hardware element 200 may include a write buffer 240 used to prevent computer system output resulting from unverified instructions from leaking to the peripheral components 112. The hardware element 200 claims ownership of any addresses mapped to peripheral components 112, and buffers these write operations in a write buffer 240 until the hardware element 200 verifies the instruction. Verification of a write operation by the hardware element 200 checks that the address and value as calculated by the hardware element 200 equals the address and value in the write buffer 240. This ensures that a write operation will not make it past the write buffer 240 if it does not correspond to a valid instruction that writes information to the external world.

In order to support embodiments including direct memory access (DMA), the hardware element 200 may further include a memory access manager 250. When a peripheral component 112 writes to memory 106, it passes through the memory access manager 250, which generates a hash value to be stored to shadow memory.

When a peripheral component 112 reads memory 106, the system must send the hash value along with the data so that the memory access manager 250 can check that the correct data is sent to the peripheral components 112.

FIG. 2 illustrates another configuration where the hardware element 200 exists outside the system 50A as a separate device. In this instantiation, a communication controller 109, such as an Ethernet or USB controller, is used to communicate with the hardware element 200, which in turn communicates to the peripheral component(s) 112.

Figure 3:
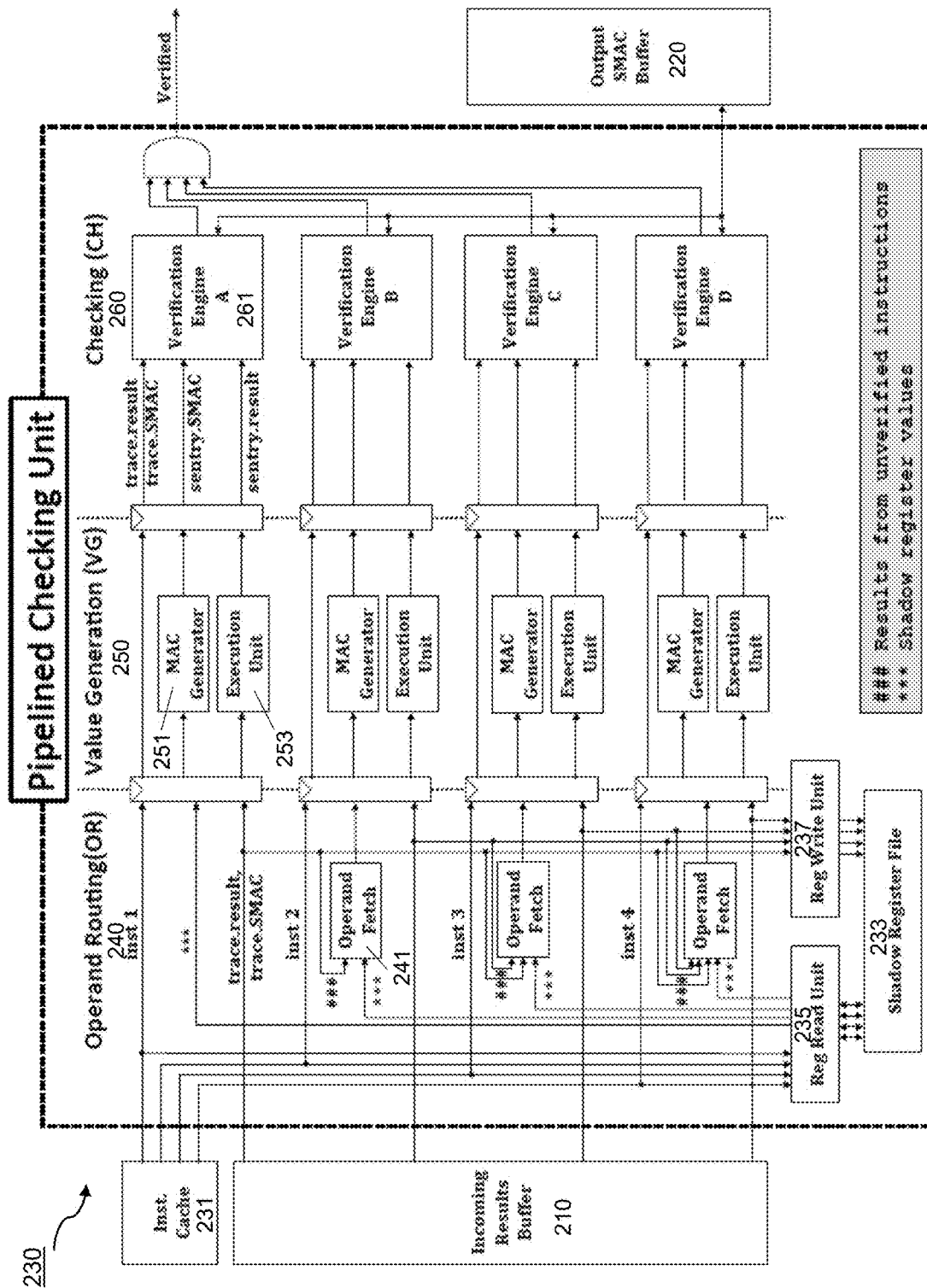
FIG. 3 illustrates a block diagram of a checking unit according to an embodiment of the invention.

FIG. 3 illustrates a block diagram of a checking unit 230 according to an embodiment of the invention. As shown, the checking unit 230 includes 4 parallel pipeline registers (4-wide) that can handle 4 instructions in parallel; however, any number of parallel pipelines is contemplated.

The checking unit 230 performs the actual parallel checking. The checking unit 230 consists of three stages: Operand Routing (OR) stage 240, Value Generation (VG) stage 250, and Checking (CH) stage 260.

During the OR stage 240, the hardware element reads operands of instructions from a read unit 235 and writes these values into pipeline registers. Reading operands allows the hardware element to begin checking the correctness of an instruction before the instructions upon which it depends are checked. Incorrect instructions equates to detecting malicious behavior by the processor, either in executing the instructions or sending the output to the hardware element.

Operands may originate either from a shadow register file 233 or from results of other instructions which enter the OR stage 240 in the same cycle and occur earlier in program order. An operand fetch unit 241 disambiguates these two cases and ensures that the correct operand values are passed to the VG stage 250. As shown by the checking unit 230 of the hardware element, the first instruction in program order reads directly from the shadow register file 233 while the fourth instruction must choose between values of the shadow register file 233 and the result reported by the three other instructions entering the OR stage 240 in the same cycle.

The OR stage 240 also speculatively writes the results of execution reported by the untrusted processor into the shadow register file 233. The shadow register file 233 contains all the register values corresponding to verified instructions along with the results reported by instructions currently in the later stages of the hardware element's pipeline. The write unit 237 ensures that if two or more instructions in the same OR stage 240 try to write into the same shadow register file 233, only the value corresponding to the instruction appearing later in program order is written.

In embodiments in which the instruction is a non-memory instruction, the execution unit 253 re-executes the instruction with the operands determined by the OR stage 240. The VG stage 250 then passes this result to the CH stage 260. The verification engine 261 checks that the result obtained from the VG stage 250 is the same as the result retrieved from the incoming trace buffer 210.

When the verification engine 261 detects a mismatch, the hardware element flags an error and disables any output resulting from that instruction. The hardware element then undoes the speculative writes to the shadow register file 233 and writes the correct result it calculated into the shadow register file 233. Finally, it flushes the pipeline register and resumes checking instructions, using what should have been the correct result of the errant instruction as reference. The hardware element thus continues to disallow external communication for instructions which depend directly or transitively on the errant instruction.

It is contemplated that the hardware element may check for correctness of proof information such as those that specify how entire programs or parts of programs produce output. Proof information may be used to reduce the amount of dynamic trace information needed by the hardware element to verify execution.

In embodiments in which the instruction is a memory instruction, the architecture 100 adopts a cryptographic memory integrity assurance scheme to verify the correctness of memory instructions. The invention is discussed using a cryptographic memory integrity assurance scheme referred to as Shadow Message Authentication Code (SMAC); however any scheme is contemplated.

According to this embodiment of the invention, shadow memory metadata is used to store cryptographically-protected metadata about memory in memory itself, allowing the system to verify load operations and store operations.

For every store operation, a MAC is generated based on the value, address of the store, and a secret key. This MAC is stored to shadow memory by a shadow store operation resulting in a SMAC value. For every load operation, the MAC corresponding to that memory location is loaded by a shadow load and verified to be correct based on the actual loaded value, address, and secret key. Thus, the trusted hardware element generates SMACs for memory instructions. For every word written into memory, the hardware element generates a word-sized SMAC using a secret key.

Then, instead of requiring the hardware element to load and store these SMACs, the architecture according to this embodiment of the invention pushes this responsibility to the (untrusted) system, reducing the complexity of the hardware element. The processor must load the SMAC for each original program load operation, and store back SMACs it receives from the hardware element for every original program store operation. Since the hardware element generates the SMACs, it knows if the processor has a stale SMAC. Allowing the processor to proceed with loading and sending stale SMACs decouples the execution of the processor and the hardware element. The untrusted processor may proceed with execution and send memory instructions to the hardware element for verification at will.

In this scheme, the processor executes original program store operations as 'normal' and sends the stored value across as part of the trace to the hardware element. During the VG stage 250 of the store operation, the MAC generator unit 251 computes a SMAC (sentry.SMAC) using the value to be stored, the accessed memory address, and the secret key. At the same time, the hardware element checks the authenticity of the value being stored using the shadow register file 233. The outgoing buffer 220 of the hardware element stores the computed SMAC before sending it across to the untrusted processor.

The processor receives the SMAC and inserts a shadow store operation into the load-store queue to store the received SMAC into shadow memory. When the shadow store operation is inserted, the processor acknowledges receipt of the SMAC. Upon receiving this acknowledgment, the hardware element evicts the corresponding SMAC from the outgoing buffer 220, as the processor now knows the latest SMAC. If the processor lies and does not insert the shadow store operation, a mismatch in the SMAC is detected when the stored value is later loaded.

For load operations, the processor loads the corresponding SMAC along with the original program data. The processor then sends the loaded SMAC (trace.SMAC) along with the result of the load operation to the hardware element 200. When verifying a load, the hardware element generates a SMAC (sentry.SMAC) using the loaded value, the address accessed, and the secret key.

The verification engine 261 then checks the outgoing buffer 220 for a SMAC value corresponding to the address accessed. Any entry found in the buffer 220 (buffer.SMAC) is considered the most recent SMAC value and is compared against the SMAC generated by the hardware element (sentry.SMAC). If such an entry is absent in the buffer 220, it means that the SMAC received from the processor was not stale, so the verification engine 261 compares the loaded SMAC (trace.SMAC) against the SMAC generated by the hardware element (sentry.SMAC).

Whether the verification engine 261 detects a mismatch between results or SMAC values, the hardware element flags an error and disables any output resulting from that instruction. It is contemplated that the checking unit 230 may include a single-level instruction cache 231 to alleviate the latency of memory accesses.

The architecture uses SMACs to verify code integrity of memory instructions. SMACs for programs are generated the first time the program is loaded into memory using a new load program instruction. This instruction queries the hardware element for SMACs for the program. The program is then loaded into memory while the SMACs for its instructions are loaded into the shadow memory. It is contemplated that a user may verify that the program has been loaded correctly and securely. For example, the hardware element could display a signature to the user using a secure I/O path, which the user could approve.

The hardware element may also use SMAC values to verify the integrity of the instruction stream. When a program is loaded into memory for the first time, the hardware element generates SMAC values for the loaded instructions, which are stored into the corresponding shadow memory. When the hardware element fetches instructions from memory, it also loads the corresponding SMAC values. The hardware element also generates SMACs for the instructions it checks and verifies that the generated SMAC equals the SMAC loaded from the memory. According to an embodiment of the invention, it is contemplated that SMACs are generated even when self-modifying code is written into memory.

The architecture according to an embodiment of the invention uses an implementation for SMACs similar to error-correcting codes (ECC) in that each cache line has with it an implicit shadow cache line, each used to store SMACs for that line's address. SMACs then always travel with their corresponding memory location through the system. While this still halves the amount of cache available, assuming the cache takes up the same space on chip, it enables shadow loads to execute implicitly; when a normal load occurs the SMAC is also loaded and sent in the trace to the hardware element, removing the need to wait on a separate shadow load operation.

Figure 4:
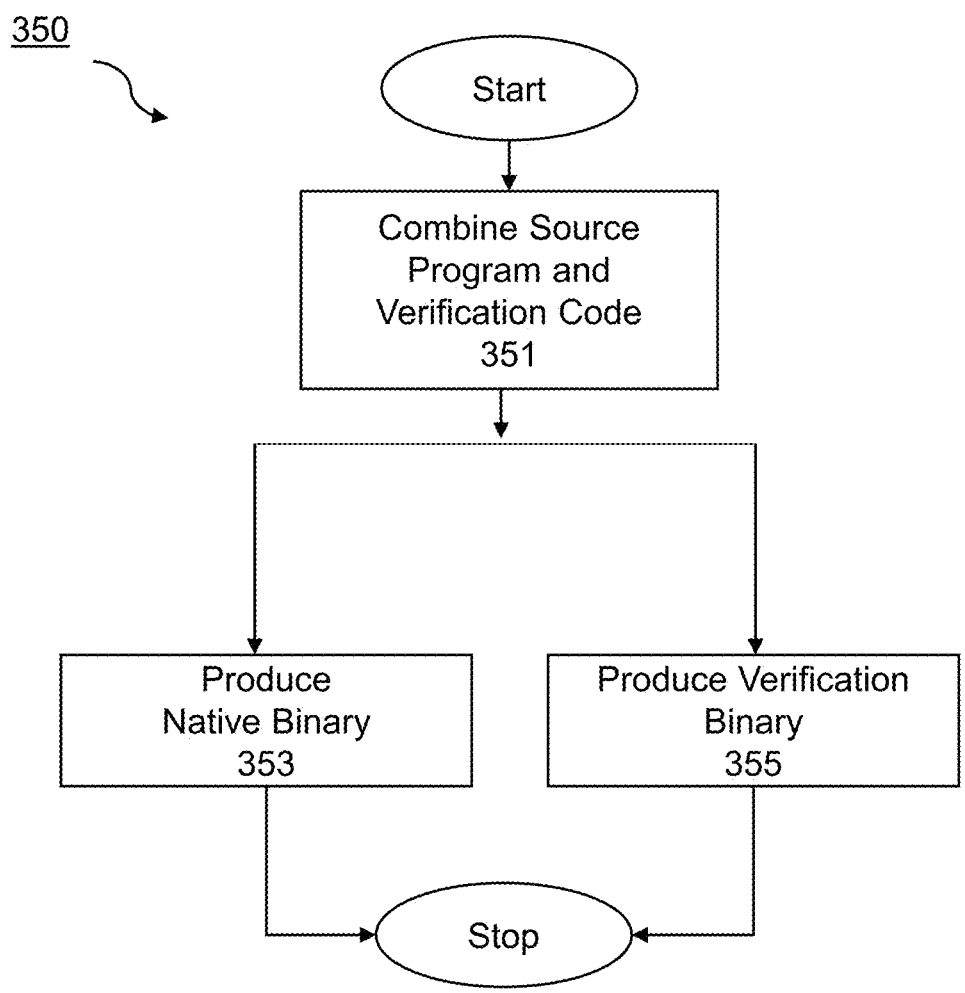
FIG. 4 illustrates a flow chart of a software toolchain according to one embodiment of the invention.

FIG. 4 illustrates a flow chart 350 of a software toolchain according to one embodiment of the invention. At step 351, a source program and it's verification code are combined by a compiler. As a result, a native binary is produced at step 353, for execution by the system, and a verification binary is produced at step 355, for execution by the hardware element.

Figure 5:
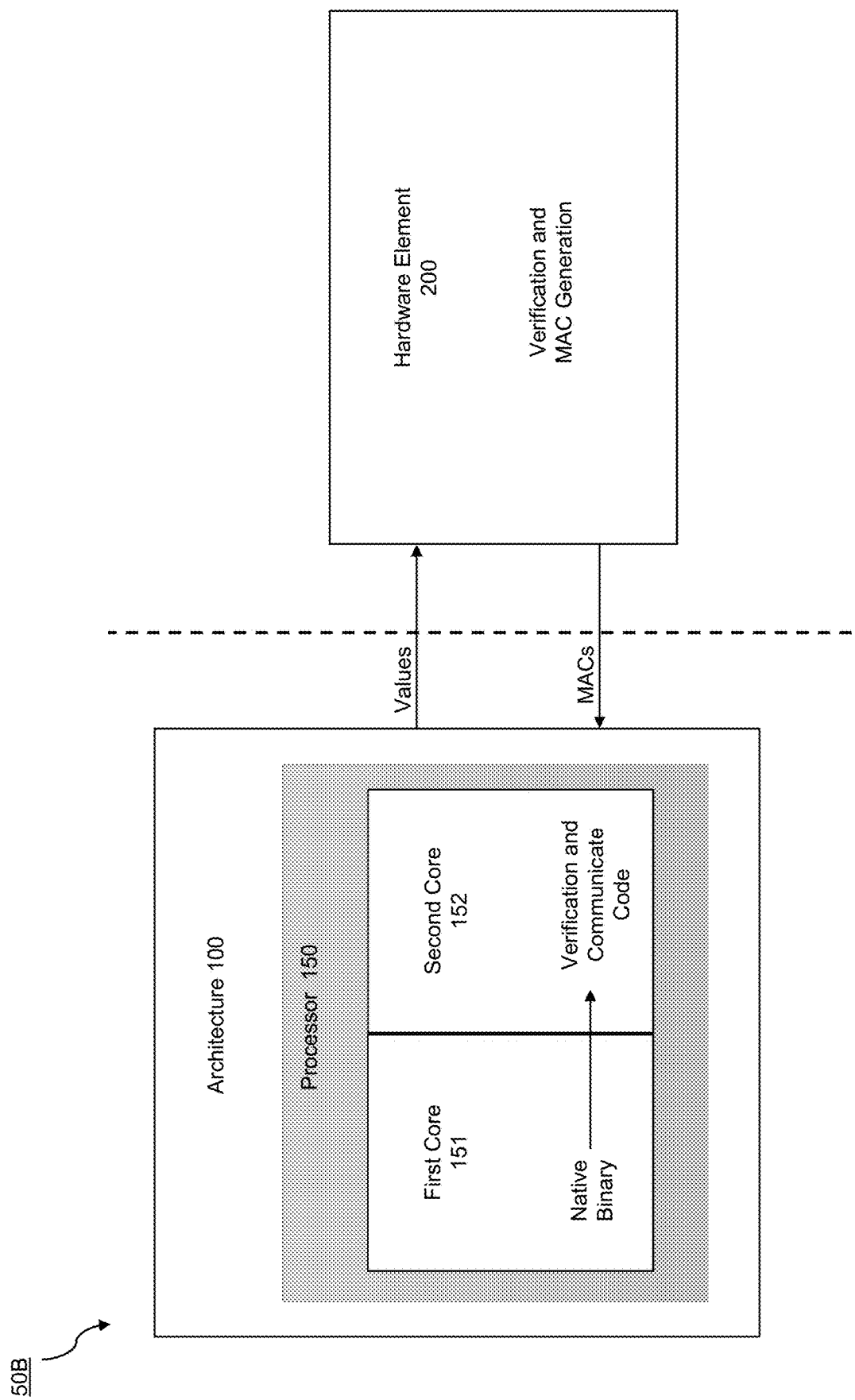
FIG. 5 illustrates a block diagram of an execution environment according to one embodiment of the invention.

FIG. 5 illustrates a block diagram of an execution environment according to one embodiment of the invention. In particular, FIG. 5 illustrates the architecture 100 of native system 50B that communicates with the hardware element 200. In this configuration, the system processor 150 contains two cores 151, 152. On the first core 151, a program executes and forwards values to the second core 152. The second core 152 executes verification code and code to communicate directly with the hardware element 200. The second core 152 then sends execution information and potential communications to the hardware element 200 for verification and MAC generation.

Figure 6:
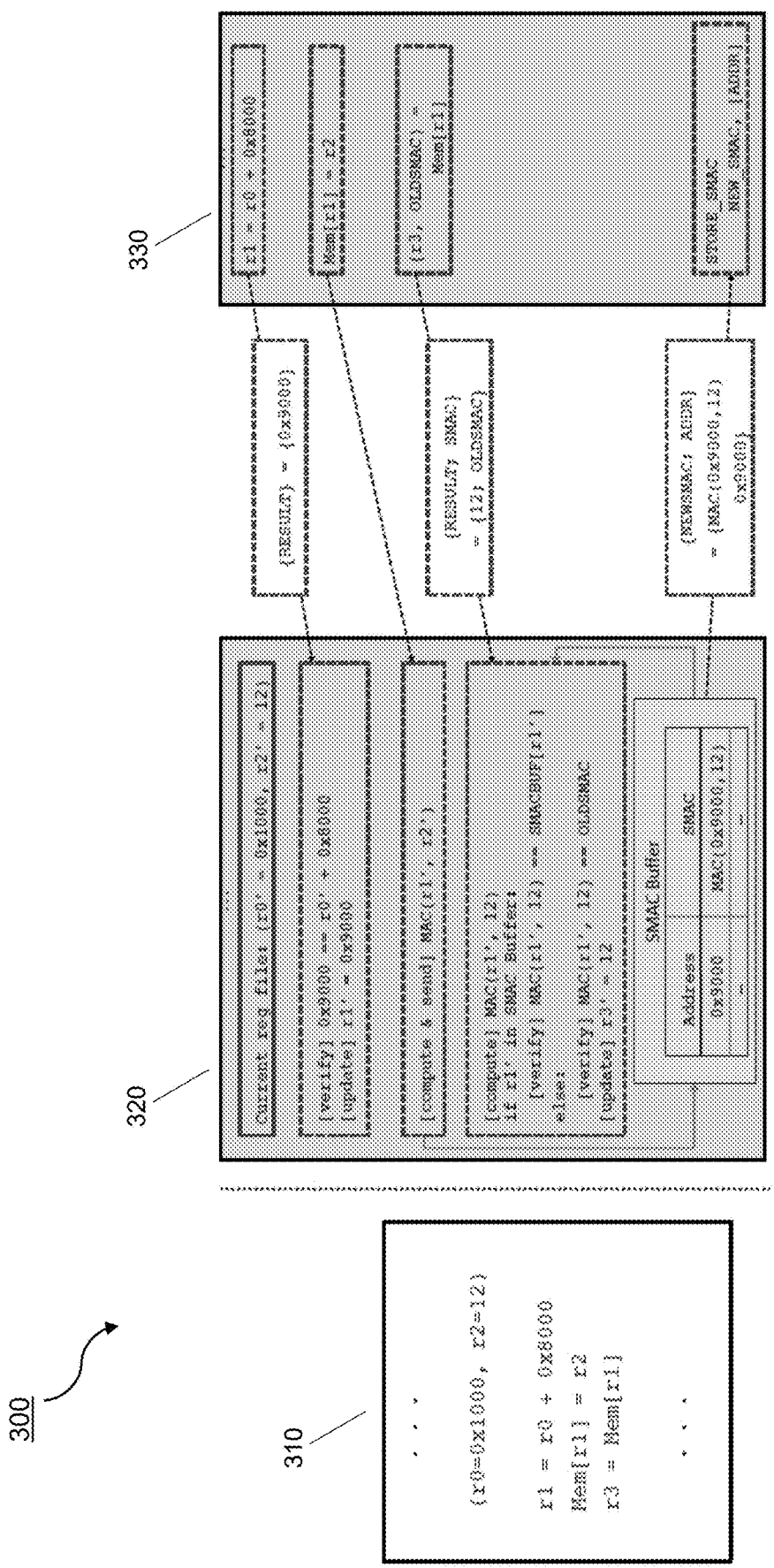
FIG. 6 illustrates a portion of exemplary original program code and verification against attack scenarios according to an embodiment of the invention.

As shown in FIG. 6, correct execution of the exemplary original program code 310 is verified by the hardware element 320 using execution by processor 330. For purposes of this embodiment, rx' indicates the shadow register in the hardware element 320 for the register rx in the untrusted processor 330.

When an attack involves the untrusted processor manipulating an arithmetic instruction's execution, the untrusted processor 330 either discards or changes the results of one or more instructions which are part of the original program code 310. For example, if the untrusted processor 330 manipulates the result of r1=r0+0x8000 to be 0x9001 instead of 0x9000, the hardware element 320 detects the manipulation when it checks the correctness of the add operation. Similarly, the untrusted processor 330 could manipulate the instruction by changing the value of an operand, for example changing register r0 from 0x1000 to 0x1001. The change in the value of the operand causes a change in the result, which is again detected by the hardware element.

Another type of attack may involve the untrusted processor manipulating the execution of a store to memory. In the example from FIG. 6, the untrusted processor could lie to the hardware element about faithfully executing Mem[r1]=r2. It could instead store some value other than 12 to 0x9000, such as 13. In this case, a SMAC is generated by the hardware element for the address-value pair (0x9000,12), and this value is placed in the outgoing buffer waiting to be sent back to memory for storing. The next time this value is loaded, for example by r3=Mem[r1], the untrusted processor sends the value it loaded to the hardware element in addition to the SMAC which was last stored in shadow memory. Because the untrusted processor actually stored 13 instead of 12, the address-value pair (0x9000, 13) will be used to generate a SMAC to check against the last valid SMAC for this memory location. Because SMAC (0x9000, 13)≠SMAC (0x9000, 12) this malicious behavior is detected.

According to FIG. 6, the SMAC for this address-value pair is stored in the outgoing buffer. This buffer serves both as a buffer for SMACs to be sent to the untrusted processor, and as a cache of recently generated SMACs for stores. When the old SMAC comes in from the untrusted processor for 0x9000, it may be stale as the new SMAC may be sitting in the outgoing buffer. In this case, the hardware element 320 ignores the incoming old SMAC from the untrusted processor in favor of the SMAC in the buffer as it is the valid one which is waiting to be stored to shadow memory.

Another attack scenario may involve a hardware Trojan in the untrusted processor inserting malicious instructions into the pipeline that did not come from a valid program. Assume that in FIG. 6 the Trojan inserts r0=r0+0x1 just before r1=r0+0x8000 to maliciously increment the value of r0 as part of an attack. The Trojan can choose whether or not to send this instruction's result to the hardware element. Assuming the malicious instruction's result (0x1001) is sent to the hardware element. The hardware element has its own valid copy of the program from memory which is protected through SMACs. When the hardware element goes to check r1=r0+0x8000, it will retrieve a result off the incoming trace buffer, and use that value to check against the result of re-executing the instruction. The hardware element's result of the instruction will be 0x9000 which does not equal the result of the malicious instruction, 0x1001, and the attack is detected.

Alternatively, the Trojan could not send the result of this instruction. In this case untrusted processor will store to address 0x9001, instead of 0x9000 as the hardware element will assume. This is equivalent to a variant of the attack mentioned above, where instead of the value to be stored being changed, the address of the store is changed. The hardware element will generate a SMAC using correct address and value (SMAC (0x9000, 12)). Therefore, if 0x9001 is ever loaded there will be a SMAC mismatch and the attack will be revealed.

Figure 7:
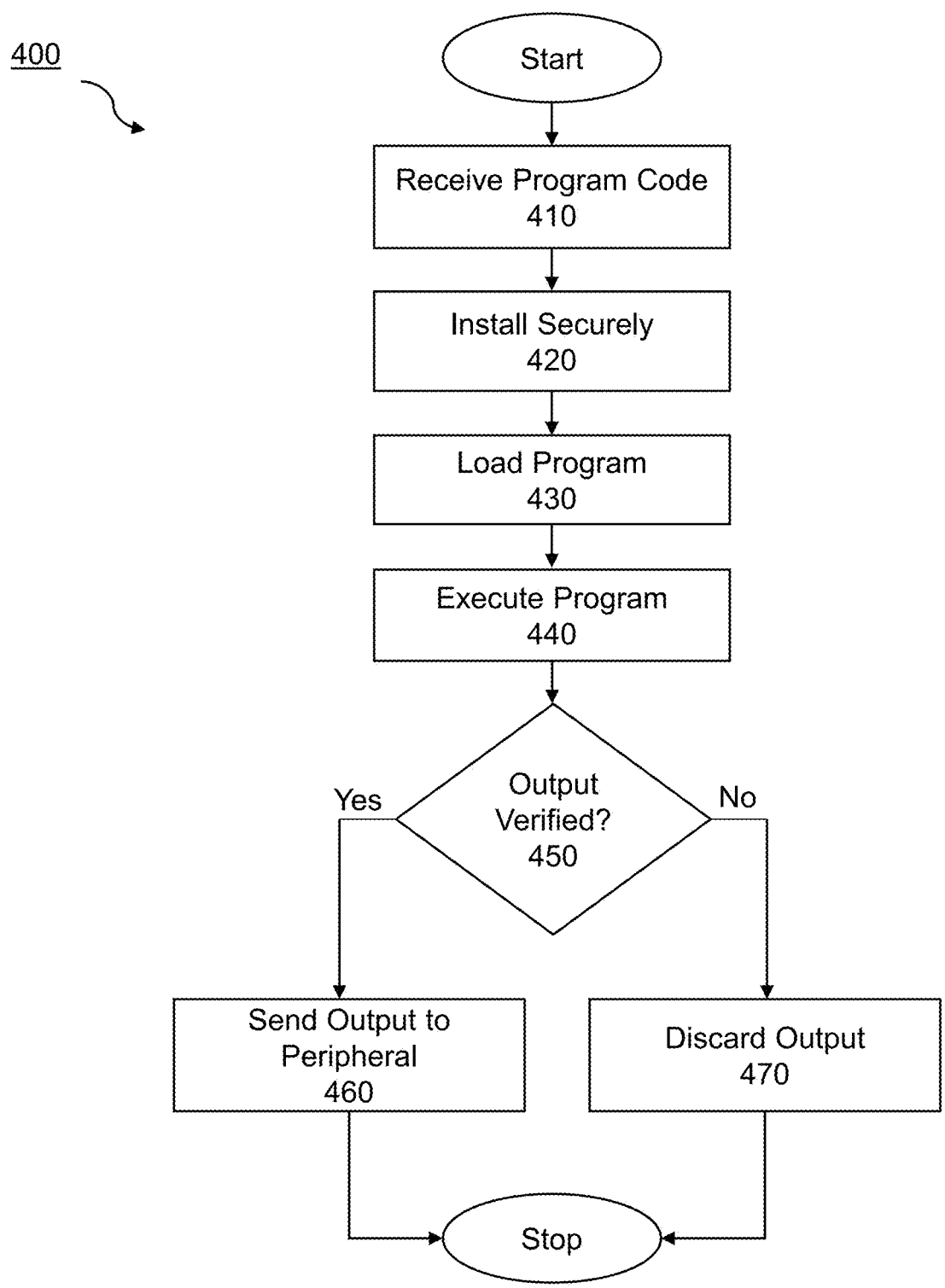
FIG. 7 illustrates a flow chart for establishing trust in hardware components according to an embodiment of the invention.

FIG. 7 illustrates a flow chart 400 for establishing trust in hardware components according to an embodiment of the invention. As shown at step 410, program code is received from either a local or external device. In order to prevent tampering, the program is securely installed on a device at step 420. One embodiment detailing secure installation is discussed more fully in FIG. 8. After secure installation the program is loaded at step 430. The program is executed by a processor at step 440 and output verified at step 450. Exemplary embodiments of verifying output according to the invention are discussed more fully in FIG. 9 and FIG. 10. Output is sent to peripheral components at step 460 only if the output is correct. If the output is incorrect—not verified—the output is discarded at step 470.

Figure 8:
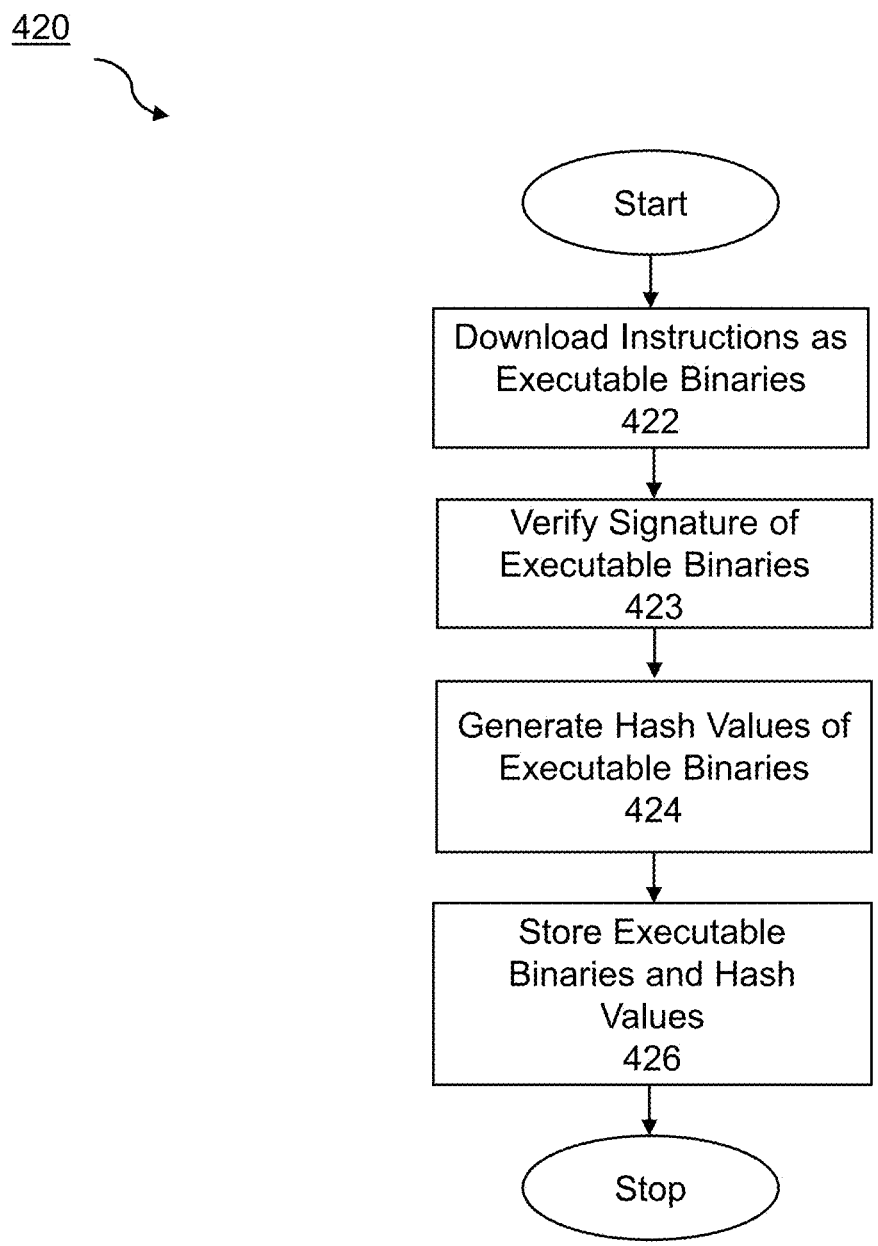
FIG. 8 illustrates a flow chart for secure installation of a program according to an embodiment of the invention.

FIG. 8 illustrates a flow chart 420 for secure installation of a program according to an embodiment of the invention. At step 422 program files are downloaded to a device. It is contemplated the program files may be downloaded from a wired or wireless network such as the Internet, a private data network, or external media. According to one embodiment, the program files are authorized to be downloaded as one or more executable binaries. At step 423, the signature of executable binaries is verified. At step 424, the hardware element according to the invention generates program hash values for the executable binaries. These hash values and binaries are stored at step 426 such as in memory, which may be used later by the architecture to verify output.

Figure 9:
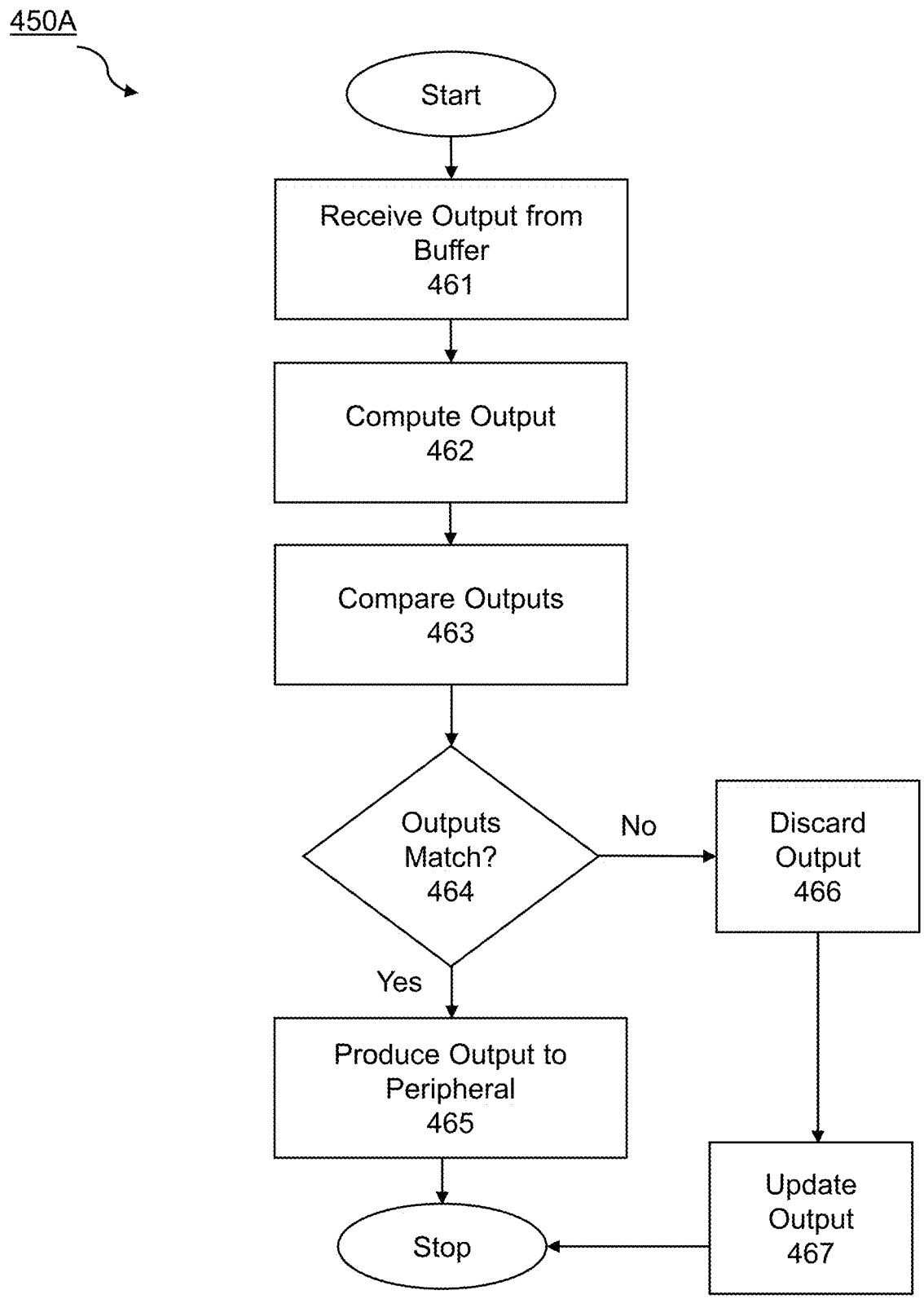
FIG. 9 illustrates a flow chart for verifying output of a program according to an embodiment of the invention.
Figure 10:
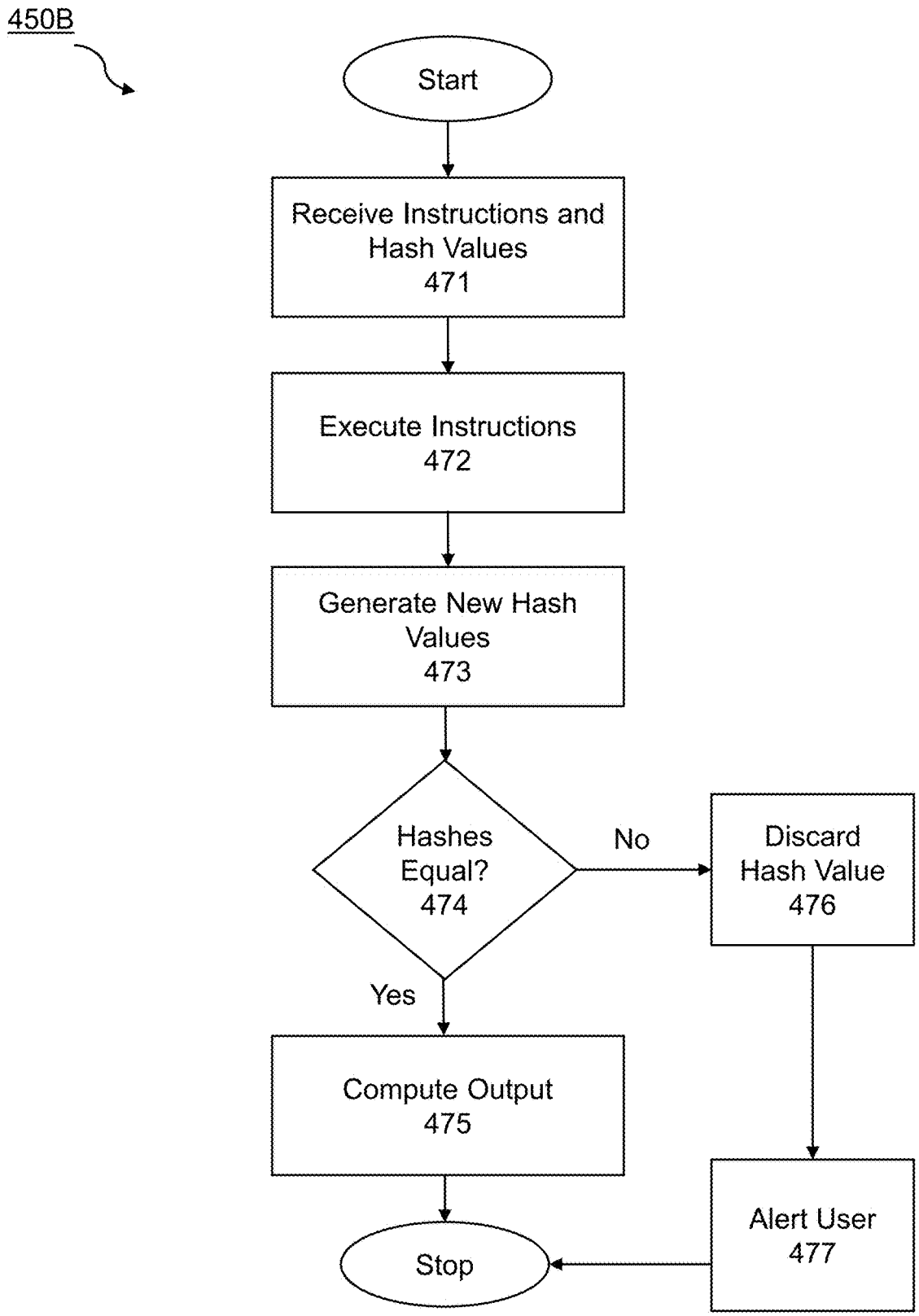
FIG. 10 illustrates a flow chart for verifying output of a program according to another embodiment of the invention.

FIG. 9 and FIG. 10 illustrate flow charts for verifying output. FIG. 9 illustrates a flow chart 450A for verifying output of a program according to an embodiment of the invention. The hardware element receives processor output and stores it in a buffer as shown by step 461. At step 462, the hardware element computes an output using instructions it receives from memory. The outputs are compared at step 463. If a match is determined at step 464, output is produced to peripheral components at step 465. If a match is not determined at step 464, the output is discarded at step 466 and the buffer updated at step 467 with the correct output.

FIG. 10 illustrates a flow chart 450B for verifying the integrity of a program according to another embodiment of the invention. The hardware element receives executed instructions and hash values as shown by step 471. At step 472, the hardware element executes the instructions (binaries) and generates a new hash at step 473. The hash values are compared at step 474. If the hashes are equal at step 474, output is computed and passed to peripheral components at step 475. If the hashes are not equal at step 474, the output is discarded at step 476 and users are alerted at step 477.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The preferred embodiment of the invention comprises a separately manufactured, pluggable hardware element. However, it is obvious to a person of ordinary skill that the hardware element may be introduced in the later stages of manufacturing or be integrated into the system so that it is not removable or pluggable.

It is understood that verification may be performed using any of absolute, cryptographic, or probabilistic methods. The selection of a particular method only changes the strength of the security guarantees and not the functionality of the invention itself. There is no intent to limit the disclosure to any one form of checking.

The invention claimed is:

1. A method for establishing trust in a computer system comprising software and a hardware components the method comprising the steps of:
   executing by the system one or more instructions, producing untrusted trace information, wherein the untrusted trace information is generated from instructions in the software or from the hardware component, wherein the hardware component is a processor containing two cores;
   forwarding values from a first core to a second core;
   executing by the second core a verification code and a code to communicate directly with the hardware component;
   communicating by the second core information to the hardware component;
   sending by the system the untrusted trace information to a verification element;
   receiving by the verification element the untrusted trace information;
   examining by the verification element at least the aspects of the untrusted trace information intended to generate computer system output to a device;

producing by the verification element computer system output to a device only when the aspects examined are correct.

2. The method of claim 1, wherein the verification element is one of the following:
   a second hardware component;
   the second hardware component with a software component, wherein the software component may be included on the second hardware component; or
   a software component included on a peripheral component.

3. The method of claim 1, wherein the examining step further comprises the step of:
   checking one or more of the following: correctness of execution of all instructions; correctness of execution of instructions influencing communication external to the computer system; correctness of proofs specifying how entire programs or parts of programs produce output; integrity of memory instructions; integrity of code being executed; and correctness of signatures of installed software.

4. The method of claim 1, wherein the receiving step further comprises the step of:
   buffering by the verification element the untrusted trace information in an incoming buffer.

5. The method of claim 1, wherein the aspects of the untrusted trace information comprise one or more selected from the group: an instruction, an operand, a result, and a MAC (Message Authentication Code) value.

6. The method of claim 5, wherein the MAC value is a hash value.

7. The method of claim 1, wherein the examining step further comprises the steps of:
   re-executing by the verification element the one or more instructions, producing trusted trace information; and
   comparing by the verification element the aspects of the untrusted trace information to the trusted trace information.

8. The method according to claim 1, wherein the examining step further comprises the steps of:
   writing by the verification element results from the untrusted trace information to one or more pipeline registers and a shadow register file;
   fetching by the verification element the one or more instructions from an incoming buffer;
   sending one or more operands to the one or more pipeline registers;
   executing the one or more instructions using the one or more operands in the one or more pipeline registers;
   comparing results of the executing step against results of the untrusted trace information; and
   determining computer system output when both results are equal.

9. The method according to claim 8, wherein the writing step further comprises the steps of:
   verifying by the verification element that only a value corresponding to an instruction that appears later in a commit order of the system is written to the shadow register file when two or more instructions try to write to the same shadow register file; and
   simultaneously verifying execution of the two or more instructions in parallel.

10. The method according to claim 9 further comprising the step of:
    breaking dependencies between the two or more instructions using the untrusted trace information.

11. The method according to claim 8, wherein the fetching step further comprises the step of:
    decoding the one or more instructions.

12. The method of claim 1, wherein the examining step further comprises the step of:
    allowing by the verification element computer system output to a device only when the aspects examined are correct.

13. The method according to claim 1, wherein one or more instructions executed by the system are instructions of a memory, the instructions comprising one or more of the following: a store operation to write values into the memory and a load operation to load values from the memory.

14. The method according to claim 13, wherein the verification element uses one or more message authentication codes (MAC) for cryptographic verification of data loaded from or stored to the memory.

15. The method according to claim 14, wherein the cryptographic verification of a store operation comprises the steps of:
    generating by the verification element a message authentication code (MAC) value corresponding to each store, each MAC value based on a stored value, a memory store address, and a secret key;
    storing each MAC value in a buffer of the verification element;
    sending by the verification element one or more MAC values to the system;
    storing by the system the one or more MAC values to a shadow memory.

16. The method according to claim 14, wherein the cryptographic verification of a load operation comprises the steps of:
    sending by the system a value loaded from the memory and a corresponding loaded message authentication code (MAC) value to the verification element as part of the untrusted trace information;
    generating by the verification element a MAC value corresponding to each load, each MAC value based on a loaded value, a memory load address, and a secret key;
    determining by the verification element if the loaded MAC value and the generated MAC value are equal.

17. The method according to claim 16, wherein the determining step further comprises the steps of:
    comparing the generated MAC value with a MAC value in a buffer if the buffer contains an entry for the memory load address; or
    comparing the generated MAC with the loaded MAC value sent as part of the untrusted trace information.

18. The method according to claim 1 further comprising the step of:
    populating by the system a cache in the verification element with one or more instructions to be verified or that have been verified by the verification element.

19. The method of claim 2, wherein the peripheral component is a host component.

20. The method of claim 1 further comprising the steps of:
    combining by a compiler a source program and a source program verification code;
    producing a native binary and a verification binary;
    executing by the system the native binary,
    executing by the hardware component the verification binary.

21. The method of claim 1, wherein the computer system further comprises a compiler and a source program, wherein the compiler combines a source program and a verification code to produce a native binary and a verification binary, and the system executes the native binary and the hardware component executes the verification binary.

22. The method of claim 1, wherein the verification element exists outside the system.

23. A pluggable trust architecture comprising:
a system,
a verification element for receiving execution information from the system to detect at least one form of incorrect execution by the system without relying on any execution information to be correct;
a barrier circuit for preventing any computer system output to a device resulting from incorrect execution; and
a compiler and a source program, wherein the compiler combines the source program and a source program verification code to produce a native binary and a verification binary, and the system executes the native binary and a hardware component executes the verification binary.

24. The pluggable trust architecture according to claim 23, wherein the verification element detects incorrect execution of instructions affecting output via peripheral components, and the barrier circuit includes an electrical barrier capable of preventing output via peripheral components.

25. The pluggable trust architecture according to claim 23, wherein a portion of one or more of the verification element and the barrier circuit are removable and output is prevented when the portion is removed from the verification element.

26. The pluggable trust architecture according to claim 23, wherein the verification element further comprises:
a buffer for storing untrusted trace information sent by the system;
a verification engine for checking correctness of instructions; and
a MAC (Message Authentication Code) generator for checking integrity of the memory and a program code.

27. The pluggable trust architecture according to claim 23, wherein the verification element further comprises:
a shadow register file to verify one or more operands used by the system;
an outgoing buffer enabling memory integrity checks; and
an incoming buffer for containing the results of instructions causing output to devices that are waiting to be verified.

28. The pluggable trust architecture according to claim 23, wherein the verification element exists outside the system.

* * * * *